(12) United States Patent
Nakamura et al.

(10) Patent No.: US 6,308,679 B1
(45) Date of Patent: Oct. 30, 2001

(54) SEPARATOR STRUCTURE OF CHAIN CASE

(75) Inventors: Kensuke Nakamura; Fuminori Kawashima; Hidehiko Kamiyama, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/507,788

(22) Filed: Feb. 22, 2000

(30) Foreign Application Priority Data

Feb. 22, 1999 (JP) .................................................. 11-042895

(51) Int. Cl.⁷ ...................................................... F01M 5/00
(52) U.S. Cl. ................................... 123/195 R; 123/195 C
(58) Field of Search ........................... 123/195 C, 195 R, 123/196 R

(56) References Cited

U.S. PATENT DOCUMENTS

| | | | |
|---|---|---|---|
| 4,993,375 | * 2/1991 | Akihiko | 123/195 C |
| 5,647,315 | * 7/1997 | Saito | 123/195 C |
| 5,887,565 | * 3/1999 | Ozeki et al. | 123/196 R |

* cited by examiner

*Primary Examiner*—Willis R. Wolfe
*Assistant Examiner*—Jason Benton
(74) *Attorney, Agent, or Firm*—Armstrong, Westerman, Hattori, McLeland & Naughton, LLP

(57) ABSTRACT

The interior of a chain case 23 accommodating therein a chain-sprocket mechanism (a sprocket 12 and a silent chain 14)provided for rotating a crankshaft 11 and camshafts 5 in an interlocking fashion and a tensioner shoe 18 for applying a predetermined tension to a slack side of a chain or a guide shoe 19 for preventing the run-out of the chain on a stretched side thereof is partitioned by providing a rib 27, 28 so as to protrude from at least either of an end face of an engine E and an inner surface of a chain cover 22 joined to the end face with distal end edges of the ribs being directed toward sides 18a, 18b of the tensioner shoe or the guide shoe that are perpendicular to the crankshaft. According to this construction, since the rib provided so as to protrude from the cylinder block or the chain cover cooperates with the tensioner shoe or the guide shoe so as to form a separator, an oil passage having a sufficient cross-sectional area can be defined without control from the chain line and necessity of enlargement of the engine.

11 Claims, 7 Drawing Sheets

SEPARATOR STRUCTURE OF CHAIN CASE

BACKGROUND OF THE INVENTION

1. Field of the Invention

The present invention relates to a separator structure for partitioning the interior of a chain case accommodating therein a chain-sprocket mechanism for rotating a crankshaft and camshafts in an interlocking fashion.

2. Description of the Related Art

An engine is known in which a part of oil used for lubricating a valve train while the engine is driven is constructed so as to flow down within a chain case accommodating therein a chain-sprocket mechanism provided on one end face of a cylinder block in a crankshaft direction for rotating a crankshaft and camshafts in an interlocking fashion.

Here, when a large volume of oil flowing down from a cylinder head to an oil pan is brought into contact with the chain-sprocket mechanism, as a matter of inconvenience, not only is rotational friction increased, but also the oil is diffused to thereby promote the misting of oil. Therefore, it is highly desirable that the oil flowing down from the cylinder head into the oil pan is prevented from being brought into contact with the chain-sprocket mechanism.

Japanese Patent Unexamined Publication No. Hei.8-218835 discloses an engine constructed from a viewpoint described above such that an oil passage is defined inside a chain case by a separator (partition wall) provided on the back of a stretched side portion of a chain.

However, application of the aforesaid related art becomes difficult if the chain line is not situated at a position suitable for provision of the separator. Moreover, if it is tried to secure a sufficient cross-sectional area for the oil passage between the back of the chain and the chain cover, it is inevitable that the engine is made larger in size.

SUMMARY OF THE INVENTION

The present invention was devised so as to solve the problem inherent in the related art and an object thereof is to provide a separator structure for a chain case which is constructed so as not only to increase the degree of freedom in position setting but also to obviate the necessity of enlargement of the engine.

The above-mentioned object can be attained by a separator structure of a chain case for partitioning the interior of the chain case in an internal combustion engine, according to the present invention, wherein the chain case accommodates a chain-sprocket mechanism for rotating a crankshaft and camshafts in an interlocking fashion, and at least one of a tensioner shoe for applying a predetermined tension to a slack side of a chain and a guide shoe for preventing the run-out of the chain on a stretched side thereof, the separator structure comprising:

an end face of the engine;

an inner surface of a chain cover joined to the end face of the engine, the chain case being defined by coupling the end face and the inner surface; and a rib protruded from at least one of the end face of the engine and the inner surface of the chain cover, wherein at least one of the tensioner shoe and the guide shoe has a surface to which a distal end edge of the rib is directed, and the surface is extended in a direction perpendicular to the crankshaft.

According to this construction, since the rib provided so as to protrude from the cylinder block or the chain cover cooperates with the tensioner shoe or the guide shoe so as to form a separator, an oil passage having a sufficient cross-sectional area can be defined without control from the chain line and necessity of enlargement of the engine. Moreover, since the separator is formed by making effective use of the tensioner shoe or the guide shoe, the amount of rib can be reduced and this can contribute to the suppression of increase in weight.

DETAILED DESCRIPTION OF THE PREFERRED EMBODIMENTS

Referring to the accompanying drawings, the construction of the present invention will be described in detail below.

Figure 1:
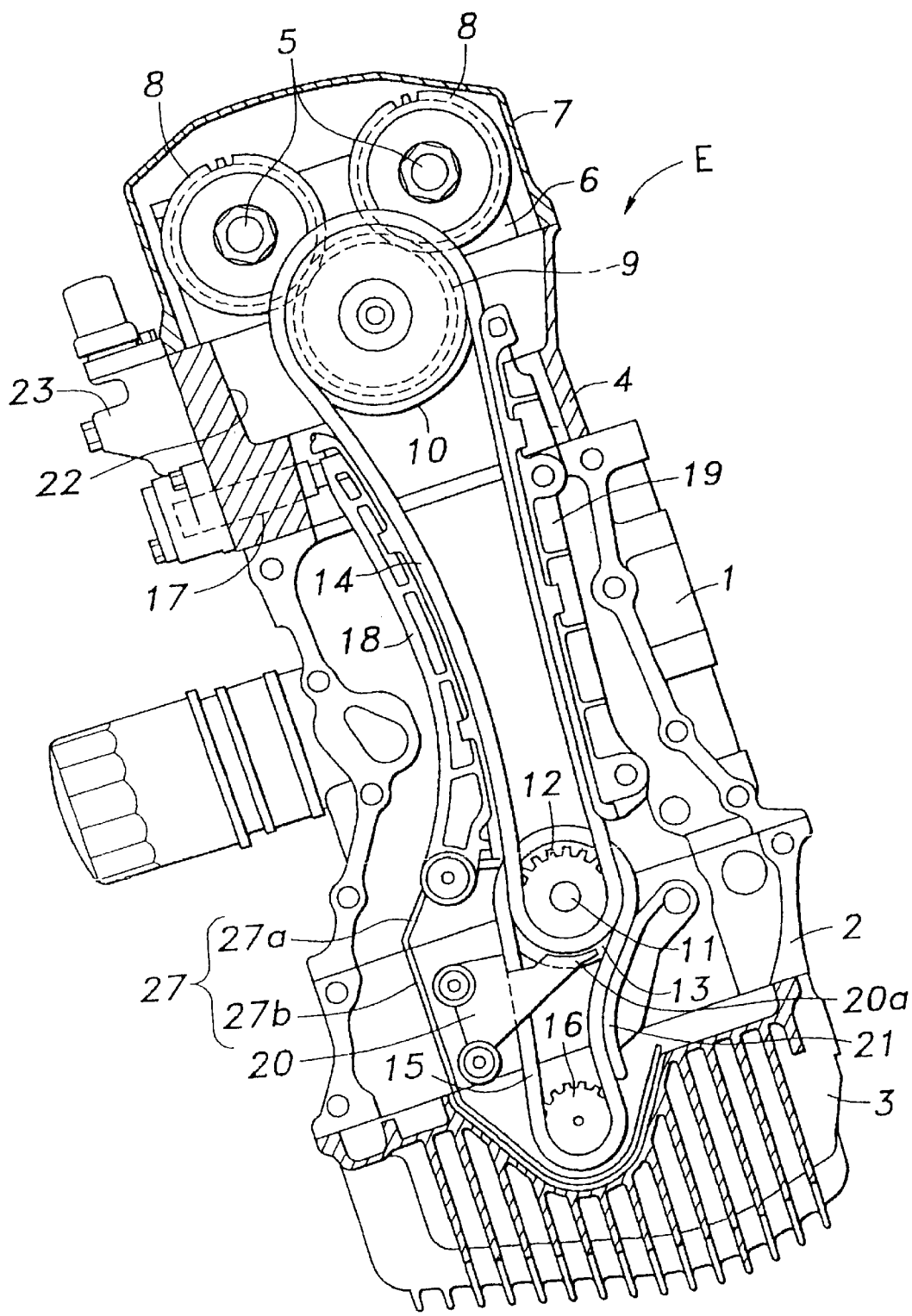
FIG. 1 is an elevation of an inline multiple-cylinder engine to which the present invention is applied, the engine being partially cut away on a crank pulley side thereof.
Figure 2:
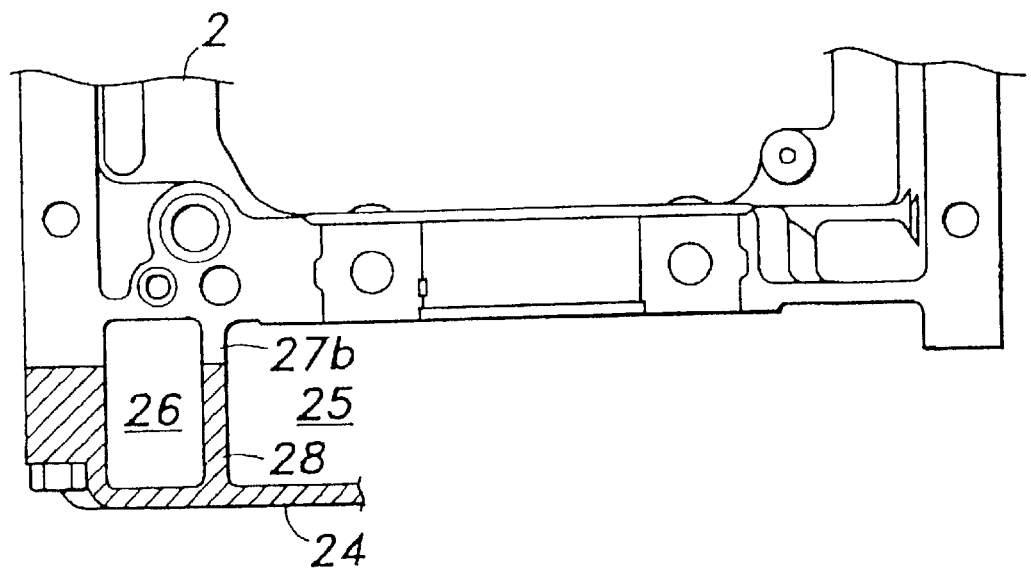
FIG. 2 is a top view of a bearing cap block in a state in which a partially cut-away chain cover is joined thereto.
Figure 3:
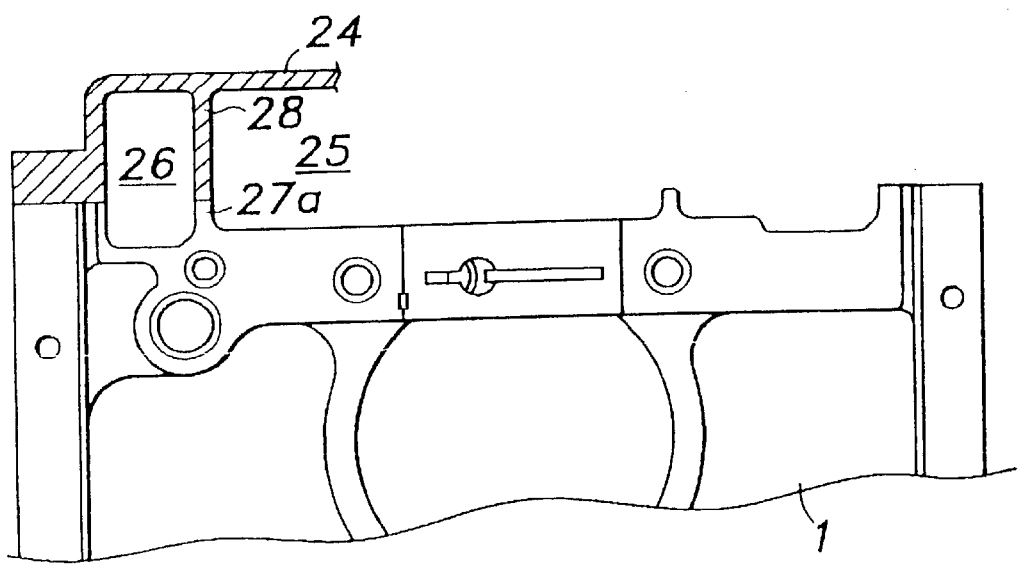
FIG. 3 is a bottom view of a cylinder block in a state in which the partially cut-away chain cover is joined thereto.

FIG. 1 is an elevation of an inline multiple-cylinder engine to which the present invention is applied, the engine being partially cutaway on a crank pulley side thereof. This engine E comprises a cylinder block 1 including in turn a plurality of cylinders arranged in series, a bearing cap block 2 joined to a lower surface of the cylinder block 1, an oil pan 3 joined to a lower surface of the bearing cap block 2 and a cylinder head 4 joined to an upper surface of the cylinder block 1. Then, a cam holder 6 pivotally supporting thereon two camshafts 5 is provided above the cylinder head 4, and these camshafts 5 are covered with a head cover 7 joined to an upper surface of the cylinder head 4.

Camshaft gears 8 are securely fitted on the two camshafts 5 at a shaft end thereof, respectively. These camshaft gears 8 are brought into mesh engagement with a common idle gear 9 pivotally secured to an end face of the cylinder head 4 on the crank pulley side. A driven sprocket 10 for the camshafts is integrally connected to the idle gear 9.

As with a known engine, a crankshaft 11 is supported at a joint surface between the cylinder block 1 and the bearing cap block 2 by main bearings.

Securely fitted on the crankshaft 11 are a camshafts drive sprocket 12 and an oil pump drive sprocket 13. These drive sprockets 12, 13 are coupled to the driven sprocket 10 for the camshafts and a driven sprocket 16 for the oil pump via separate silent chains 14, 15, respectively. In this construction, the camshafts 5 made integral with the camshaft gears 8 and the oil pump (not shown) are constructed so as to be simultaneously driven by the crankshaft 11 via the idle gear 9 made integral with the driven sprocket 10 for the camshafts.

A tensioner shoe 18 pressed by virtue of a thrust applied by a hydraulic plunger device 17 and a run-out preventing guide shoe 19 are additionally provided, respectively, on a slack side (leftward in FIG. 1) and a stretched side (rightward in FIG. 1) of the silent chain 14 extended between the driven sprocket 10 for the camshafts and the drive sprocket 12. The tension of the camshafts driving silent chain 14 is automatically adjusted so as to be constant at all times and is prevented from running out excessively by these shoes.

In addition, additionally provided on the pump driving chain 15 are a chain guide shoe 20 having integrated thereinto a guide shoe 20a for preventing the jumping of the gear teeth of the drive sprocket 12 and a tensioner shoe 21.

A sprocket casing part 22 is integrally formed on an end portion of the cylinder head 4 on a crank pulley side thereof, for receiving therein the idle gear 9, the driven sprocket 10 for the camshafts and a part of the silent chain 14 which is wound around the sprocket. Then, a hydraulic pressure control valve 23 for intermittently controlling the hydraulic pressure applied to a valve operating condition varying device (not shown) is mounted on a side surface of the sprocket casing part 22 (the left side surface in the figure) together with the hydraulic plunger device 17.

As shown in FIGS. 2 to 5, an end face of a part where the cylinder block 1 and the bearing cap block 2 are coupled together is totally covered with a chain cover 24 on the crank pulley side thereof, and a chain case 25 is defined inside the chain cover 24 which accommodates therein the drive sprocket 12 and the camshafts driving chain 14, the tensioner shoe 18 and the guide shoe 19 for the camshafts driving chain, the oil pump driving chain 15 and the driven sprocket 16 for the oil pump, and the guide shoe 20 and the tensioner shoe 21 for the oil pump driving chain.

Ribs 27, 28 are provided so as to protrude from respective confronting surfaces of the cylinder block 1 and the bearing cap block 2, and the chain cover 24 as a separator for defining inside the chain case 25 an oil passage 26 extending from the cylinder head 4 to the oil pan 3. As to the rib 27, as shown in FIG. 6, a rib part 27a on the cylinder block 1 side and a rib part 27b on the bearing cap block 2 side are continuously provided so as to protrude from the end faces of the cylinder block 1 and the bearing cap block 2, respectively, on the crank pulley side thereof, and the rib 28 provided on the inner surface of the chain cover 24 is provided so as to protrude therefrom at substantially corresponding positions.

Figure 4:
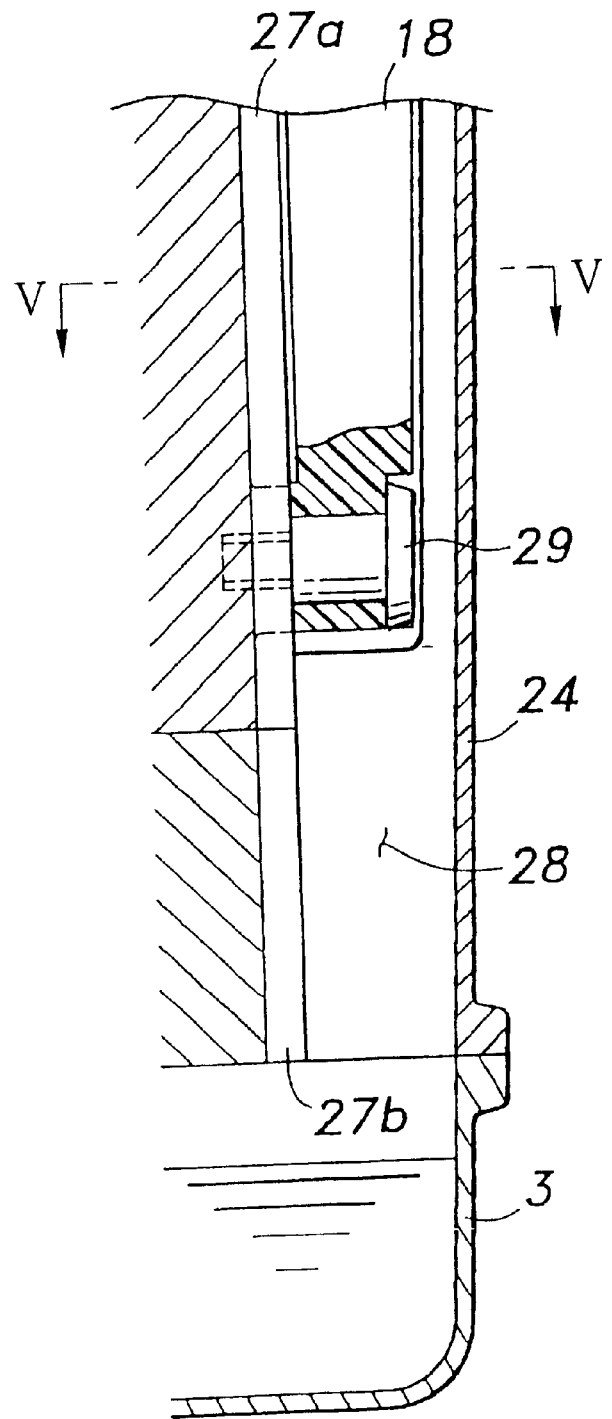
FIG. 4 is a vertical sectional view of main part taken along the line IV—IV in FIG. 5.
Figure 5:
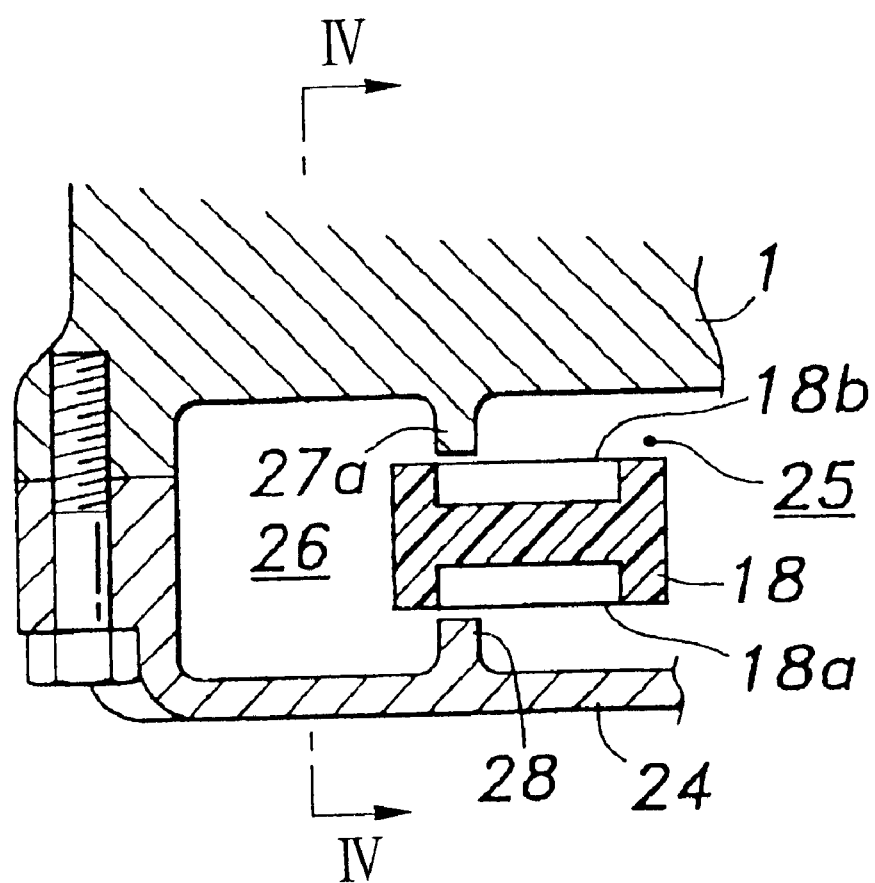
FIG. 5 is a cross-sectional view of the main part taken along the line V—V in FIG. 4.

As shown in FIGS. 4 and 5, the rib 28 on the inner surface of the chain cover 24 is cut at a portion confronting a portion where the tensioner shoe 18 extends in such a manner that the rib 28 confronts a front surface 18a of the tensioner shoe 18 with a minute gap being formed therebetween, while the rib 28 is brought into abutment with distal end edges of the ribs 27a, 27b provided so as to protrude from outer surfaces of the cylinder block 1 and the bearing cap block 2 at the remaining portions thereof In this construction, the rib 27 on the outer surfaces of the cylinder block 1 and the bearing cap block 2 and the rib 28 (the portion thereof partially cut away) on the inner surface of the chain cover 24 are provided so as to protrude toward the sides of the tensioner shoe 18 that are perpendicular to the crankshaft, that is, both the front and back sides 18a, 18b of the tensioner shoe 18 at the portion where the tensioner shoe 18 extends, and these ribs cooperate with each other to define the oil passage 26 inside the chain case 25. In addition, since the rib 28 confronts an end surface of an oscillating support shaft 29 of the tensioner shoe 18, it contributes to the prevention of dislocation of the oscillating support shaft 29.

The oil passage 26 communicates with a space above the oil surface within the oil pan 3, and oil flowing down is directly recovered in the oil pan 3. On the other hand, a space opposite to the oil passage 26 partitioned by the ribs 27, 28 and the tensioner shoe 18 functions as a crank case ventilation passage.

Figure 6:
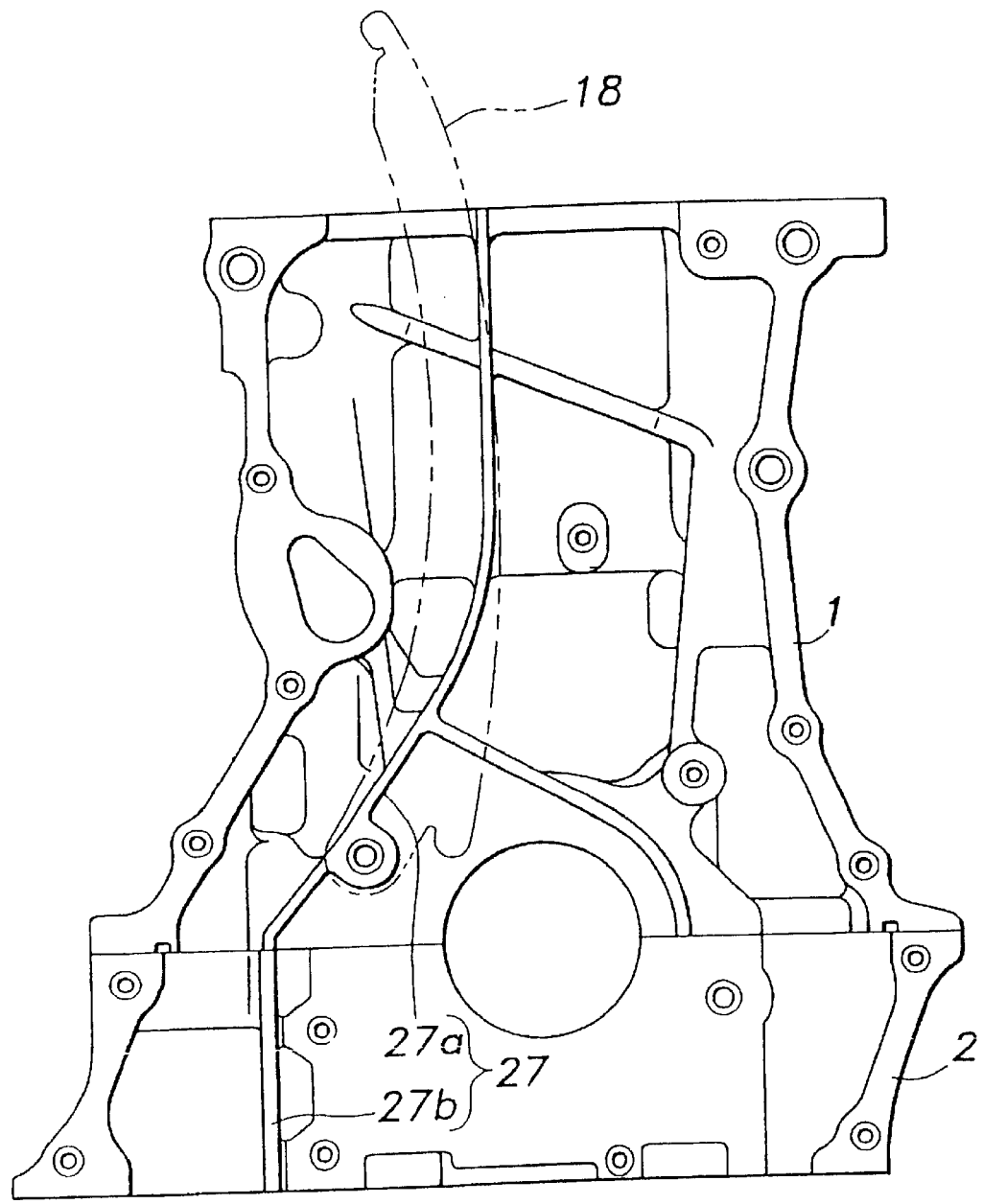
FIG. 6 is an elevation showing a crank pulley side of the cylinder block and the bearing cap block that are joined together.

According to the present invention, since the separator can be formed without modifying the tensioner shoe 18 at all, it is possible to get rid of a risk of causing a deterioration in behavior of the tensioner shoe 18 that would result from the increase in weight thereof, and moreover, as shown by imaginary lines in FIG. 6, since the ribs 27, 28 may be provided so as to protrude from the positions overlapping the tensioner shoe 18, the degree of freedom in position setting can be increased in accordance with the width of the tensioner shoe 18.

The engine E is inclined slightly leftward on the cylinder head 4 side, and oil from the cylinder head 4 is constructed so as to flow down leftward as seen in FIG. 1. In addition, the hydraulic pressure control valve 23 and the plunger device 17 for the chain tensioner are provided on the oil passage 26 side of the engine, oil flowing out of these devices is also recovered highly effectively.

In the mode of carrying out the invention described above, the ribs are described as being disposed on the movable tensioner shoe 18 in such a manner confront each other, but even if the ribs are so provided on the fixed guide shoe, a separator similar to the aforesaid one can be formed. In addition, in a case where the engine is inclined in an opposite direction to that in the mode for carrying out the invention described above, the ribs are provided on the guide shoe 19 disposed on the right-hand side of the engine as seen in FIG. 1 so as to form a separator.

Figure 7:
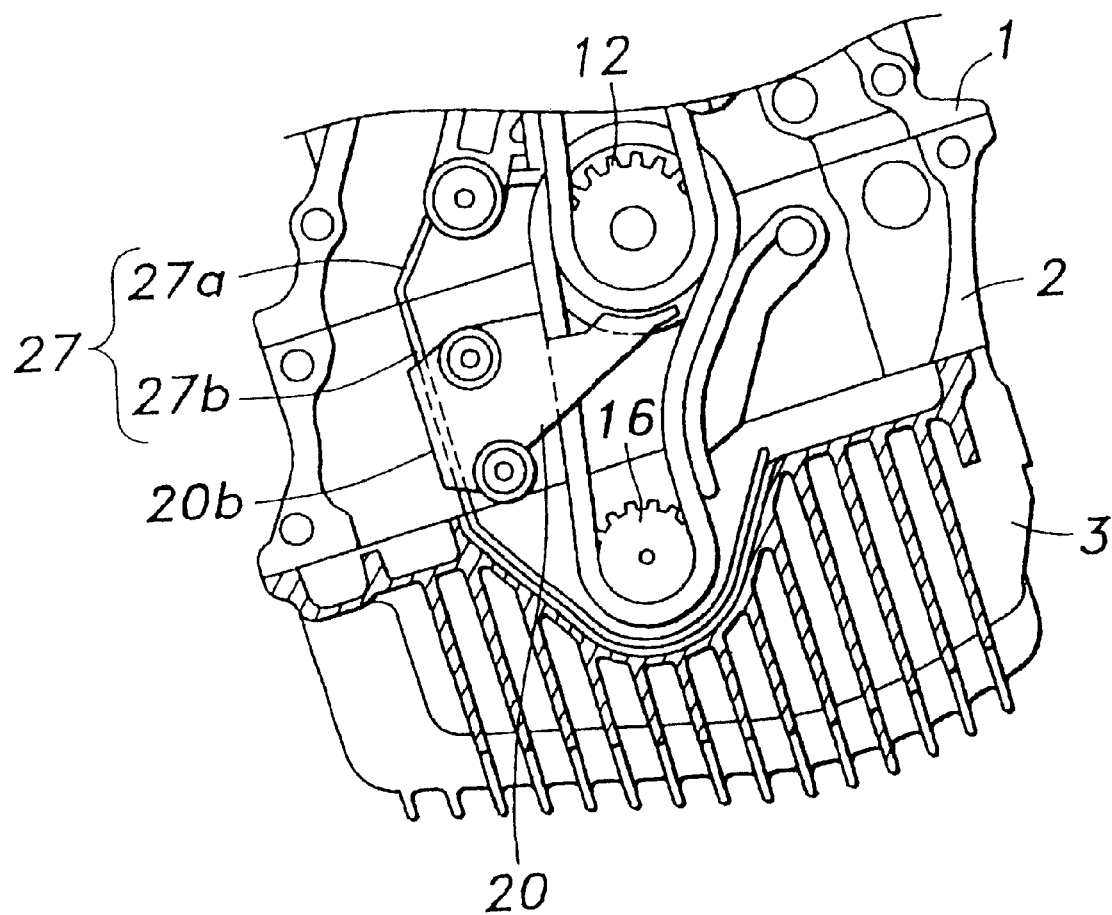
FIG. 7 is an elevation of a main part showing another mode for carrying out the invention.
Figure 8:
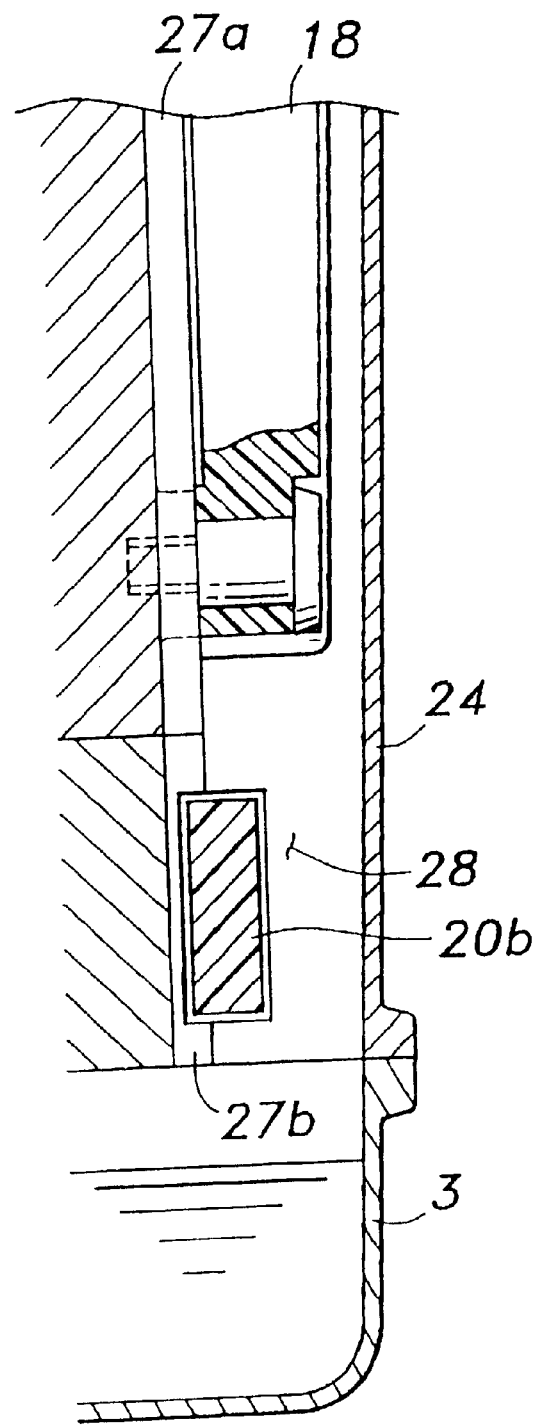
FIG. 8 is a vertical sectional view of a main part of the mode for carrying out the invention shown in FIG. 7 which is identical to that shown in FIG. 4.

FIGS. 7 and 8 show another mode for carrying out the invention. In this mode, an extending portion 20b is provided at a portion where a guide shoe 20 for the oil pump driving chain is mounted in such a manner as to protrude toward a rib 27b provided on a bearing cap block 2, and the extending portion 20b is held between the distal end edges of the rib 27b and a rib 28 provided on confronting surfaces of the bearing cap block 2 and a chain cover 24, respectively. Even in this construction, the rib 27b, the rib 28 and the extending portion 20b of the guide shoe 20 cooperate with each other to form a separator.

While only certain embodiments of the invention have been specifically described herein, it will apparent that numerous modifications may be made thereto without departing from the spirit and scope of the invention.

According to the present invention, since the rib provided so as to protrude from the cylinder block or the chain cover cooperates with the tensioner shoe or the guide shoe to form the separator, the sufficient cross-sectional area for the oil passage can be secured without the control from the chain line and necessity of enlargement of the chain cover. In other words, the present invention is largely advantageous in constructing a separator structure for a chain case that can increase the degree of freedom in position setting and obviate the necessity of enlargement of the chain case. Moreover, since the separator is formed by making effective use of the tensioner shoe or the guide shoe, the amount of the rib can be reduced, this contributing to the suppression of increase in weight of the engine.

What is claimed is:

1. A separator structure of a chain case for partitioning the interior of said chain case in an internal combustion engine, wherein said chain case accommodates a chain-sprocket mechanism for rotating a crankshaft and camshafts in an interlocking fashion, and at least one of a tensioner shoe for applying a predetermined tension to a slack side of a chain and a guide shoe for preventing the run-out of said chain on a stretched side thereof, said separator structure comprising:

an end face of the engine;

an inner surface of a chain cover joined to said end face of said engine, said chain case being defined by coupling said end face and said inner surface; and a rib protruded from at least one of said end face of said engine and said inner surface of said chain cover, wherein at least one of said tensioner shoe and said guide shoe has a surface to which a distal end edge of said rib is directed, and said surface is extended in a direction perpendicular to said crankshaft, 2. The separator structure of a chain case as set forth in claim 1, wherein said rib confronts an end surface of an oscillating support shaft of said tensioner.

3. The separator structure of a chain case as set forth in claim 1, wherein one of a hydraulic pressure control valve and a plunger device for a chain tensioner is provided on a side of an oil passage partitioned by said rib.

4. The separator structure of a chain case as set forth in claim 1, wherein a hydraulic pressure control valve and a plunger device for a chain tensioner are provided on a side of an oil passage partitioned by said rib.

5. The separator structure of a chain case as set forth in claim 1, wherein said rib comprises a pair of confronting ribs which are respectively provided on said end face of said engine and said inner surface of said chain cover.

6. The separator structure of a chain case as set forth in claim 1, wherein said rib is provided so as to protrude from a side facing a chain guide shoe integrated with a guide shoe for preventing a sprocket from jumping gear teeth.

7. The separator structure of a chain case as set forth in claim 1, wherein said rib comprises a first rib formed on said cylinder block, and a second rib formed on a bearing cap block so as to be continuous with said first rib.

8. A separator structure of a chain case for partitioning the interior of said chain case in an internal combustion engine, wherein said chain case accommodates a chain-sprocket mechanism for rotating a crankshaft and camshafts in an interlocking fashion, and at least one of a tensioner shoe for applying a predetermined tension to a slack side of a chain and a guide shoe for preventing the run-out of said chain on a stretched side thereof, said separator structure comprising:

an end face of the engine;

an inner surface of a chain cover joined to said end face of said engine, said chain case being defined by coupling said end face and said inner surface; and a pair of ribs respectively protruded from said end face of said engine and said inner surface of said chain cover, wherein at least one of said tensioner shoe and said guide shoe has a surface to which a distal end edge of said rib is directed, said surface is extended in a direction perpendicular to said crankshaft, and at least one of said ribs confronts an end surface of an oscillating support shaft of said tensioner.

9. The separator structure of a chain case as set forth in claim 8, wherein one of a hydraulic pressure control valve and a plunger device for a chain tensioner is provided on a side of an oil passage partitioned by said rib.

10. The separator structure of a chain case as set forth in claim 8, wherein a hydraulic pressure control valve and a plunger device for a chain tensioner are provided on a side of an oil passage partitioned by said rib.

11. A separator structure of a chain case for partitioning the interior of said chain case in an internal combustion engine, wherein said chain case accommodates a chain-sprocket mechanism for rotating a crankshaft and camshafts in an interlocking fashion, and at least one of a tensioner shoe for applying a predetermined tension to a slack side of a chain and a guide shoe for preventing the run-out of said chain on a stretched side thereof, said separator structure comprising:

an end face of the engine;

an inner surface of a chain cover joined to said end face of said engine, said chain case being defined by coupling said end face and said inner surface; and a pair of ribs respectively protruded from said end face of said engine and said inner surface of said chain cover, wherein at least one of said tensioner shoe and said guide shoe has a surface to which a distal end edge of said rib is directed, said surface is extended in a direction perpendicular to said crankshaft, and at least one of a hydraulic pressure control valve and a plunger device for a chain tensioner is provided on a side of an oil passage partitioned by said rib.

\* \* \* \* \*